United States Patent [19]

Ishii et al.

[11] Patent Number: 5,314,141
[45] Date of Patent: May 24, 1994

[54] CASSETTE LOADING DEVICE FOR ACCOMMODATING CASSETTES OF DIFFERENT SIZES IN A TAPE CASSETTE RECORDING AND/OR REPRODUCING APPARATUS

[75] Inventors: Masami Ishii; Osamu Murayama; Kenji Kasahara; Yoshimori Horiuchi; Toshihiro Tokito, all of Kanagawa, Japan

[73] Assignee: Sony Corporation, Tokyo, Japan

[21] Appl. No.: 713,986

[22] Filed: Jun. 12, 1991

[30] Foreign Application Priority Data

Jun. 19, 1990 [JP] Japan .................. 2-160296
Jun. 19, 1990 [JP] Japan .................. 2-160297
Jun. 19, 1990 [JP] Japan .................. 2-160298

[51] Int. Cl.[5] .............. G11B 15/66; G11B 15/18
[52] U.S. Cl. ............................ 242/199; 360/94
[58] Field of Search ............... 242/197, 198, 199, 201, 242/200; 360/94

[56] References Cited

U.S. PATENT DOCUMENTS

| 3,740,495 | 6/1973 | Kihara | 360/85 |
| 4,664,337 | 5/1987 | Shiratori | 242/199 |
| 4,873,593 | 10/1989 | Baranski | 360/94 |
| 4,984,109 | 1/1991 | Yokoo | 360/94 |
| 5,046,169 | 9/1991 | Tsujino | 360/94 |
| 5,082,195 | 1/1992 | Saito et al. | 242/199 |

FOREIGN PATENT DOCUMENTS

| 0133822 | 3/1985 | European Pat. Off. | |
| 0342619 | 11/1989 | European Pat. Off. | |
| 3327403 | 4/1985 | Fed. Rep. of Germany | |
| 3432831 | 11/1985 | Fed. Rep. of Germany | |
| 63-108546 | 5/1988 | Japan | 360/94 |
| 63-112845 | 5/1988 | Japan | 360/94 |
| 2164193 | 3/1986 | United Kingdom | |

OTHER PUBLICATIONS

Patent Abstracts of Japan vol. 9, No. 259 (P-397) (1982) Oct. 17, 1985 & JP-A-60 109 052 (Sony K.K.) Jun. 14, 1985.

Primary Examiner—Daniel P. Stodola
Assistant Examiner—John Q. Nguyen
Attorney, Agent, or Firm—William S. Frommer; Alvin Sinderbrand

[57] ABSTRACT

In a tape cassette recording and/or reproducing apparatus capable of selective operation with a relatively large or small-sized cassette containing a respective pair of rotatable reels having a relatively large or small center-to-center distance, respectively; a cassette holder is movable between a cassette receiving and discharging position and a loading position and can receive a selected one of the large and small-sized cassettes when in the receiving and discharging position and can convey the selected cassette to the loading position; a pair of reel bases are movable relative to each other for varying the center-to-center distance therebetween; a reel base adjusting device is selectively driven in first or second modes for respectively moving the reel bases to first or second positions wherein the center-to-center distance therebetween is suitable for engagement with the reels of a large or small-sized cassette; a detector detects the size of a cassette received in the holder and assumes different conditions when detecting the large and small-sized cassettes, respectively; and a drive member is movable with the holder at least part of the way from the receiving and discharging position toward the loading position and is responsive to the condition of the detector for selectively driving the reel base adjusting device in the first and second modes, respectively, so as to dispose the reel bases in positions suitable for the size cassette being conveyed by the holder to the loading position.

20 Claims, 11 Drawing Sheets

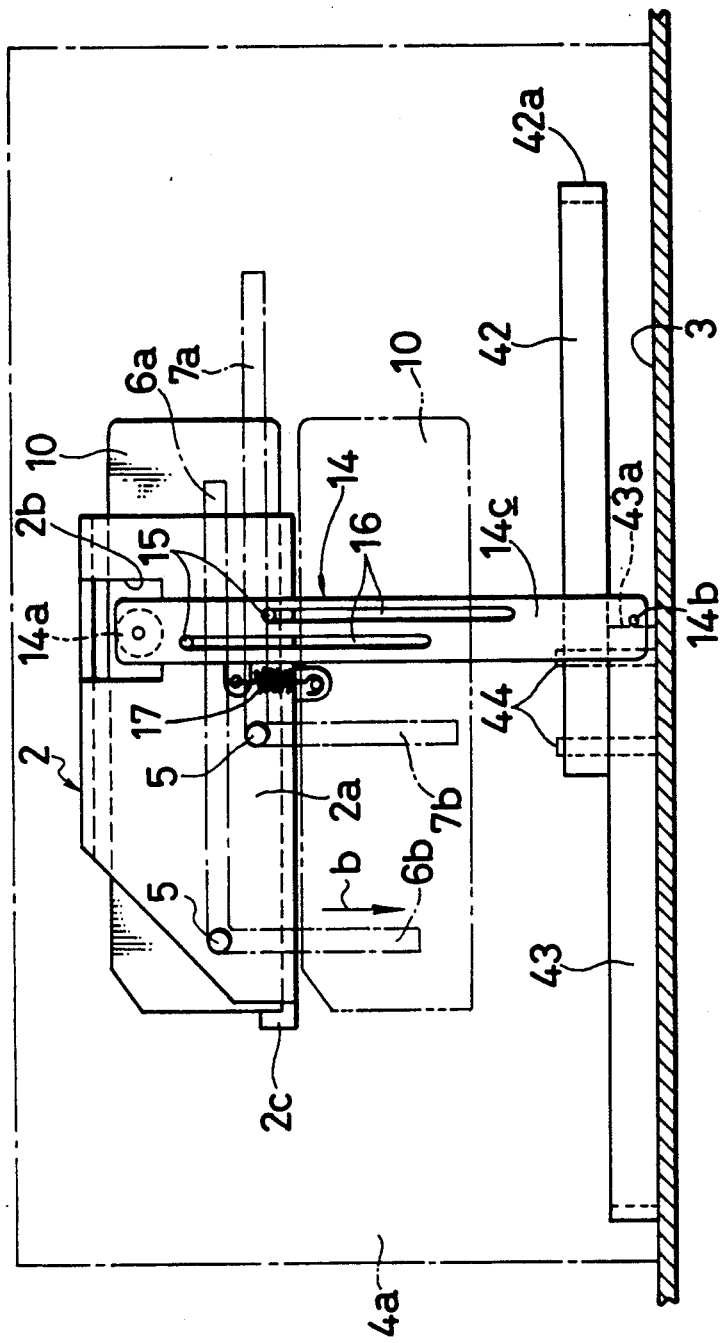

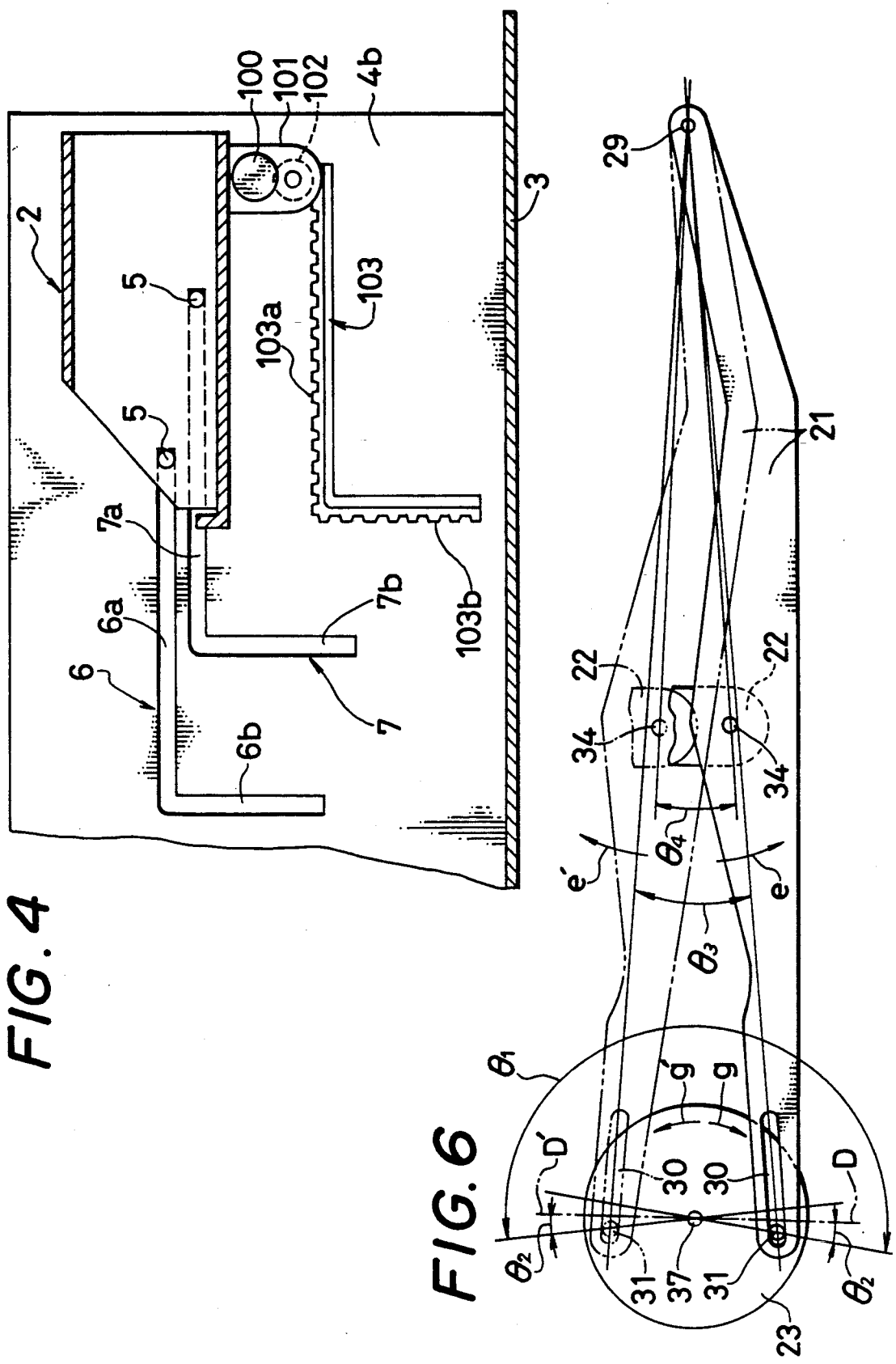

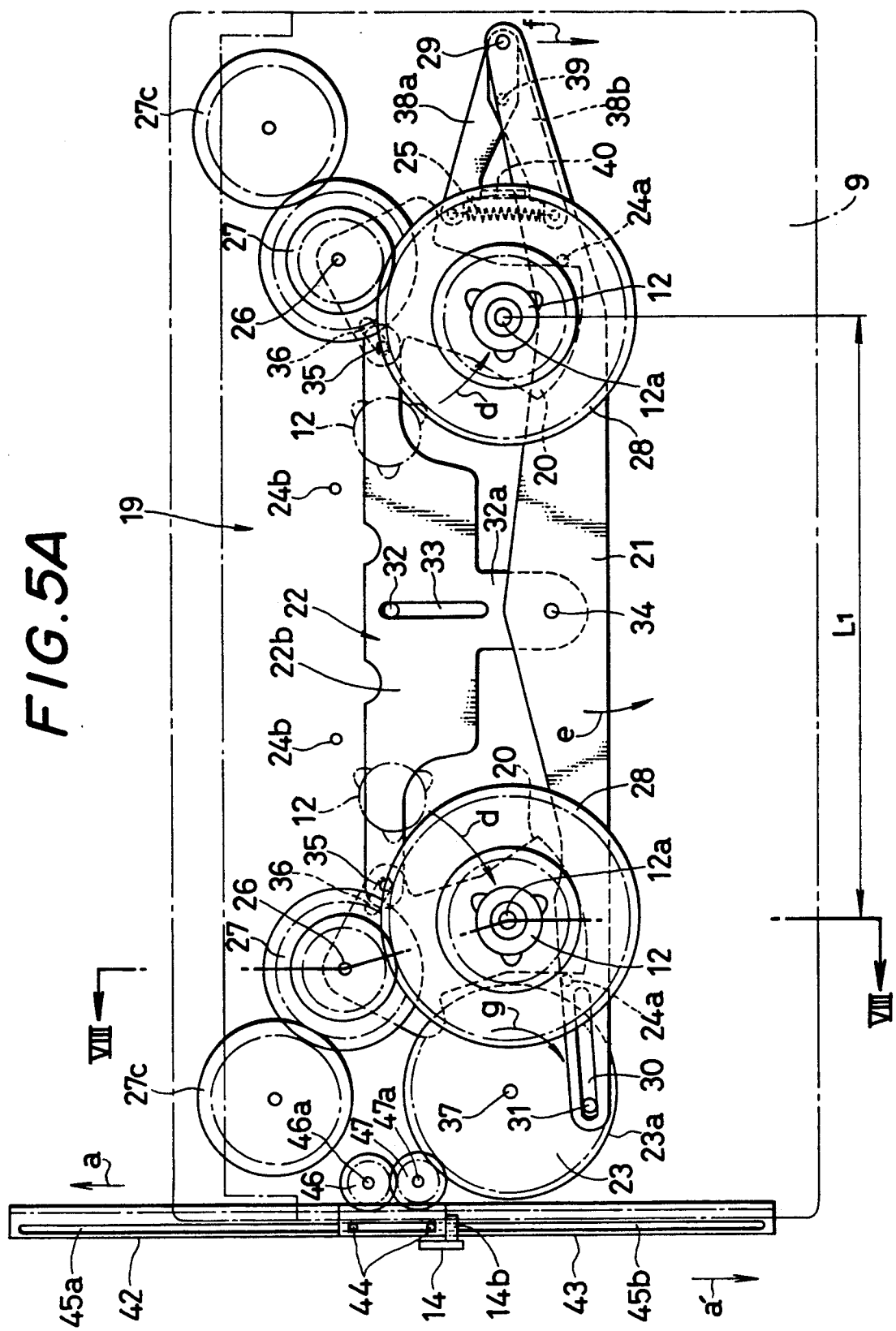

CASSETTE LOADING DEVICE FOR ACCOMMODATING CASSETTES OF DIFFERENT SIZES IN A TAPE CASSETTE RECORDING AND/OR REPRODUCING APPARATUS

BACKGROUND OF THE INVENTION

1. Field of the Invention

This invention relates generally to tape cassette recording and/or reproducing apparatus in which tape cassettes of different sizes can be selectively employed.

2. Description of the Prior Art

In a known tape cassette recording and/or reproducing apparatus capable of selectively employing tape cassettes of different sizes, for example, as disclosed in U.S. Pat. No. 4,664,337, having a common assignee herewith, a cassette holder is movable between a cassette receiving and discharging position, where it can receive a selected one of relatively large-sized and small-sized cassettes, and a loading position to which the selected cassette is conveyed by the holder. The known tape cassette recording and/or reproducing apparatus has a pair of reel bases movable relative to each other for varying the center-to-center distance therebetween, and a reel base adjusting device including a dedicated motor, that is, a motor employed only for varying the center-to-center distance between the reel bases, and which is selectively driven for moving the reel bases to positions in which the reel bases are engageable with the reels of a relatively large-sized cassette conveyed by the holder to the loading position, or to positions in which the reel bases are engageable with the reels of a relatively small-sized cassette conveyed to the loading position. Further, in the known apparatus, the size of a tape cassette inserted in the cassette holder at the cassette receiving and discharging position is detected and operation of the motor of the reel base adjusting device is controlled in response to such detection for ensuring that the center-to-center distance between the reel bases will correspond to that between the reels of the inserted tape cassette for engagement of the reel bases with such reels when the tape cassette is conveyed to the loading position.

However, the reel base adjusting device including a dedicated motor for driving the same when changing the distance between the reel bases is undesirably complicated in construction, and hence is expensive to produce. In this respect, it will be appreciated that the motor for driving the reel base adjusting device is in addition to the motor that is conventionally provided for effecting movements of the cassette holder between its cassette receiving and discharging position and loading position.

OBJECTS AND SUMMARY OF THE INVENTION

Accordingly, it is an object of the present invention to provide a tape cassette recording and/or reproducing apparatus in which tape cassettes of different sizes can be selectively employed, while avoiding the above mentioned disadvantages of the prior art.

More specifically, it is an object of the present invention to provide a tape cassette recording and/or reproducing apparatus, as aforesaid, in which the center-to-center distance between the reel bases is automatically adjusted so as to correspond to that between the reels of a selected relatively large-sized cassette or relatively small-size cassette without providing a motor dedicated to that purpose.

It is a further object of this invention to provide a tape cassette recording and/or reproducing apparatus, as aforesaid, in which a relatively simple and inexpensive mechanism is employed for detecting the size of a tape cassette inserted in the cassette holder at the cassette receiving and discharging position, and then for suitably adjusting the center-to-center distance between the reel bases in the course of the movement of the selected cassette with the cassette holder to the loading position.

In accordance with an aspect of this invention, a tape cassette recording and/or reproducing apparatus capable of selective operation with at least a relatively large-sized cassette or a relatively small-sized cassette having relatively large and small widths, respectively, and containing respective pairs of rotatable reels which, in the large-sized cassette, have a first relatively large center-to-center distance and, in the small-sized cassette, have a second relatively small center-to-center distance, comprises a cassette holder moveable between a cassette receiving and discharging position and a loading position and being operative to receive a selected one of the relatively large-sized and small-sized cassettes when in the cassette receiving and discharging position and to convey the selected cassette therewith to the loading position, a pair of reel bases moveable relative to each other for varying the center-to-center distance between the reel bases, reel base adjusting means selectively driven in a first mode for moving the reel bases to first positions in which the center-to-center distance therebetween is equal to the first center-to-center distance so as to be engageable with the reels of a relatively large-sized cassette conveyed by the holder to the loading position, and in a second mode for moving the reel bases to second positions in which the center-to-center distance therebetween is equal to the second center-to-center distance so as to be engageable with the reels of a relatively small-sized cassette conveyed by the holder to the loading position, detecting means for detecting the size of a cassette received in the cassette holder in the cassette receiving and discharging position and which assumes first and second conditions when detecting the relatively large-sized and relatively small-sized cassettes, respectively, and drive means moveable with the cassette holder at least part of the way from the cassette receiving and discharging position toward the loading position and being responsive to the first and second conditions of the detecting means for driving the reel base adjusting means in the first and second modes, respectively, and thereby disposing the reel bases in the first and second positions, respectively, thereof when the cassette holder conveys a relatively large-sized cassette or a relatively small-sized cassette, respectively, to the loading position.

It is an advantage of a tape cassette recording and/or reproducing apparatus according to this invention, as aforesaid, that a motor provided for moving the cassette holder from the cassette receiving and discharging position to the loading position is also operable for driving the reel base adjusting means, through the movement of the drive means therefor with the cassette holder.

In accordance with another aspect of this invention, the cassette holder is guided to move in a path having a horizontal portion extending from the cassette receiving and discharging position to an intermediate position and a vertical portion extending from the intermediate position to the loading position, and the drive means for the reel base adjusting means is movable with the cassette holder only between the cassette receiving and discharging position and the intermediate position during which movement the reel base adjusting means completes movements of the reel bases to either their first positions or their second positions for accommodating a large-sized cassette or a small-sized cassette, respectively.

In accordance with a further feature of this invention, the drive means for the reel base adjusting means includes a drive member mounted on the cassette holder for horizontal movement with the latter and being vertically movable relative to the cassette holder, and spring means urging the drive member downwardly relative to the cassette holder to a lower position corresponding to the second mode of the reel base adjusting means, while the detecting means includes a cassette sensing member mounted on the drive member so as to be engaged only by a relatively large-sized cassette received in the cassette holder for displacing the drive member against the force of the spring means to an upper position corresponding to the first mode of the reel base adjusting means.

In a preferred embodiment of the invention, the reel base adjusting means includes first and second gear racks mounted for rectilinear movements in superposed upper and lower paths extending parallel with the horizontal portion of the path of movement of the cassette holder and being engageable by the drive member in the upper and lower positions, respectively, for movement by the drive member with the cassette holder in moving along the horizontal portion of the path of the holder, gear means meshing with the gear racks for constraining the gear racks to move in opposite directions in their superposed paths, and means establishing the first mode when the first gear rack is engaged by the drive member and establishing the second mode when the second gear rack is engaged by the drive member.

The above, and other objects, features and advantages of the invention, will be apparent in the following detailed description of an illustrative embodiment of the invention which is to be read in connection with the accompanying drawings, wherein corresponding parts are identified by the same reference numerals in the several views.

BRIEF DESCRIPTION OF THE DRAWINGS

FIGS. 3A and 3B are views similar to those of FIGS. 2A and 2B, respectively, but with the tape cassettes conveyed by the respective cassette holders being shown in full lines in intermediate positions, and in dot-dash lines in loading positions;

FIG. 4 is a sectional view taken along the line IV—IV on FIG. 1A for schematically illustrating a motor driven mechanism for moving the cassette holder between its cassette receiving and discharging position and loading position;

FIGS. 5A and 5B are plan views of a reel base adjusting device included in the tape cassette recording and/or reproducing apparatus, and which is shown in the positions thereof when a large-sized cassette or a small-sized cassette is disposed in the cassette holder, as in FIGS. 1A and 1B, respectively;

FIG. 6 is a plan view of a transmission assembly included in the reel base adjusting device of FIGS. 5A and 5B;

DETAILED DESCRIPTION OF A PREFERRED EMBODIMENT

Figure 1A:
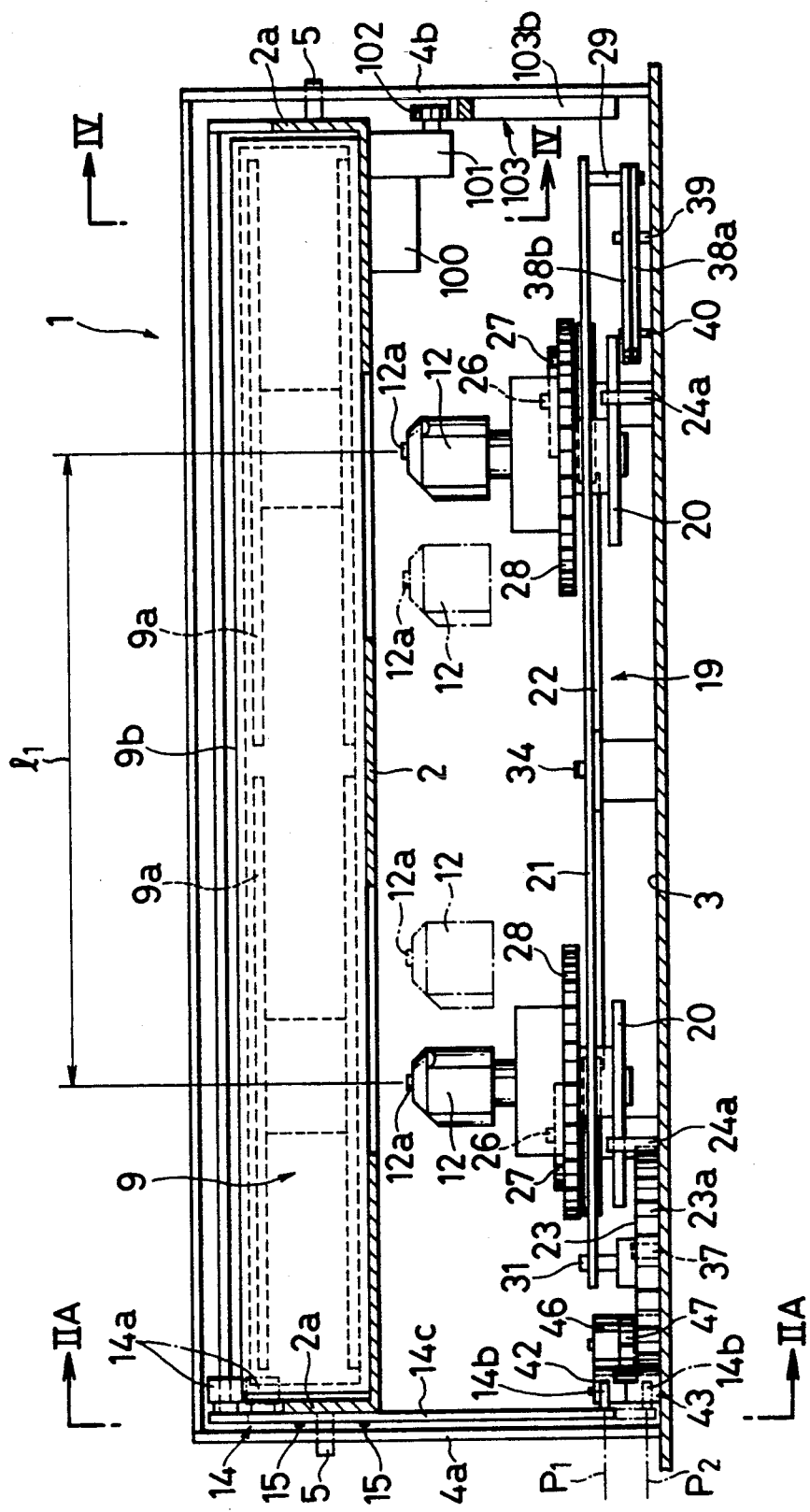
FIG. 1A is a schematic front elevational view of a cassette loading device for a tape cassette recording and/or reproducing apparatus in accordance with an embodiment of this invention, and which is shown with its cassette holder in a cassette receiving and discharging position and having a large-sized tape cassette accommodated therein.

Referring to the drawings in detail, and initially to FIGS. 1A–3B thereof, it will be seen that a tape cassette recording and/or reproducing apparatus in accordance with an embodiment of this invention has a cassette loading device 1 which generally comprises a cassette holder 2 horizontally arranged between a pair of supporting side plates 4a and 4b directed vertically upward from a chassis 3. The supporting side plates 4a and 4b are each formed with inverted L-shaped guide slots 6 and 7 which, as shown particularly on FIG. 4, include horizontal portions 6a and 7a and vertical portions 6b and 7b depending from the inner or rear ends of the respective horizontal slot portions 6a and 7a. Guide rollers 5 project outwardly from side portions 2a of the holder 2 and are received in the slots 6 and 7 of the adjacent side plates 4a and 4b for guiding the cassette holder 2 in a path of movement extending between a cassette receiving and discharging position shown in full lines on FIGS. 2A and 2B and a loading position in which a cassette 9 or 10 conveyed by the holder 2 is disposed as shown in dot-dash lines on FIGS. 3A and 3B. It will be apparent that such path of movement of the cassette holder 2 includes a horizontal portion along which the cassette holder is moveable in the direction of an arrow a on FIGS. 2A and 2B from its cassette receiving and discharging position shown in full lines to an intermediate or cassette inserted position shown in full lines on FIGS. 3A and 3B. The path of movement of the cassette holder 2 further includes a vertical portion corresponding to the vertical portions 6b and 7b of the guide slots 6 and 7, and along which the holder 2 with a cassette therein is moveable from the intermediate or cassette inserted position to the loading position shown in dot-dash lines on FIGS. 3A and 3B.

A suitable drive mechanism is provided for effecting the desired movements of the cassette holder 2 between the cassette receiving and discharging position and the loading position. As shown merely by way of example on FIGS. 1A, 1B and 4, such drive mechanism for the cassette holder 2 may include a reversible electric motor 100 mounted at the underside of the cassette holder 2 adjacent the supporting side plate 4b and being coupled, as through a reduction gearing 101, with a pinion 102 which meshes with a gear rack 103 secured on the side plate 4b. The gear rack 103 is of inverted L-shaped configuration and extends parallel to the guide slots 6 and 7 so as to similarly have a horizontal portion 103a and a vertical portion 103b (FIG. 4).

Figure 1B:
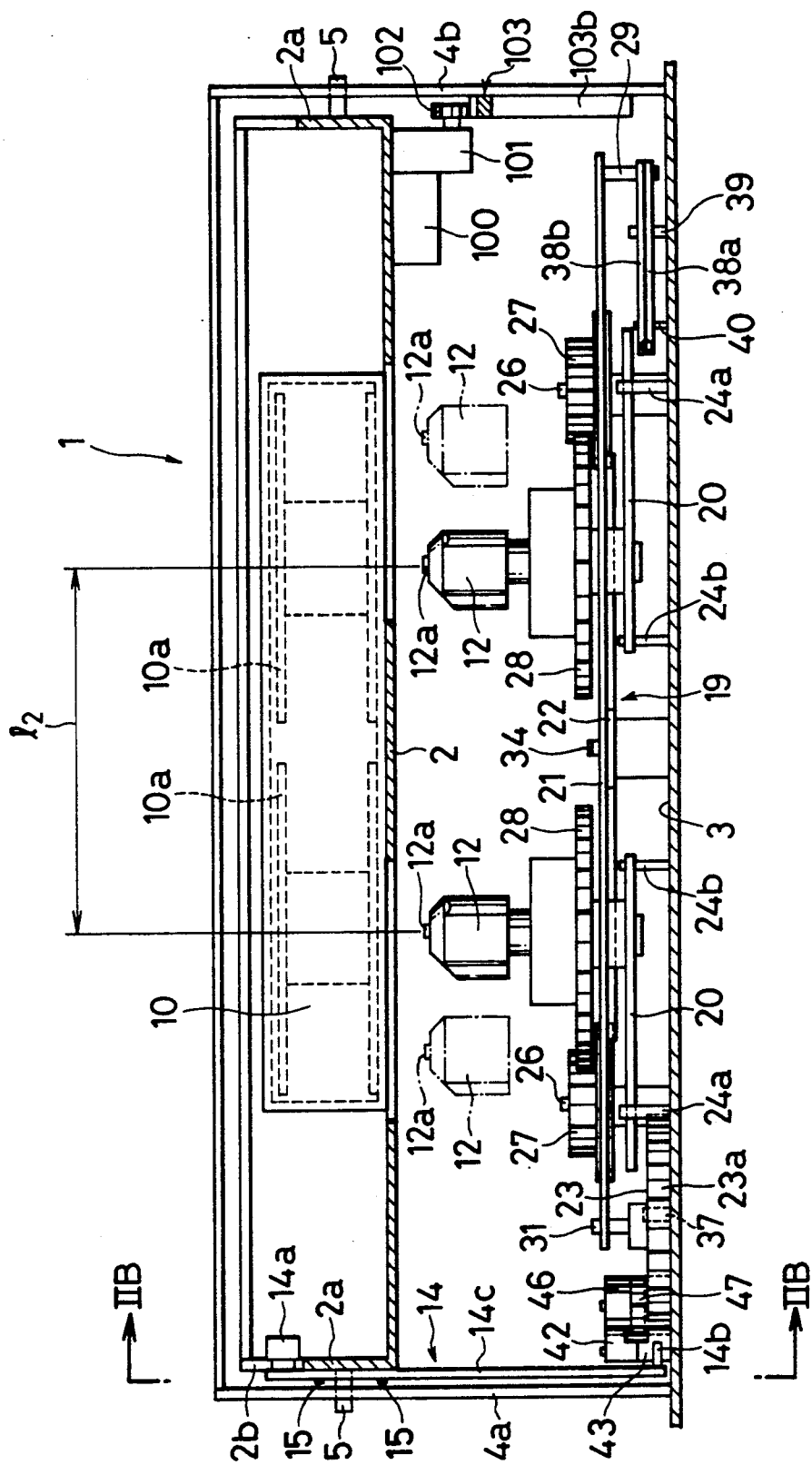
FIG. 1B is a view similar to that of FIG. 1A, but showing a small-sized cassette in the cassette holder.

The cassette loading device 1 is selectively usable with either a large-sized cassette 9 (FIG. 1A) or a small-sized cassette 10 (FIG. 1B). The large-sized cassette 9 has a width approximately equal to the lateral distance between the side walls 2a of the holder 2, and the center-to-center distance $l_1$ between the pair of rotatable reels 9a provided within the cassette 9 is relatively large. On the other hand, the center-to-center distance $l_2$ between the pair of rotatable reels 10a in the small-sized cassette 10 is relatively small and, as shown on FIG. 1B, the width of the cassette 10 is substantially less than the lateral distance between the side walls 2a of the holder.

Figure 2A:
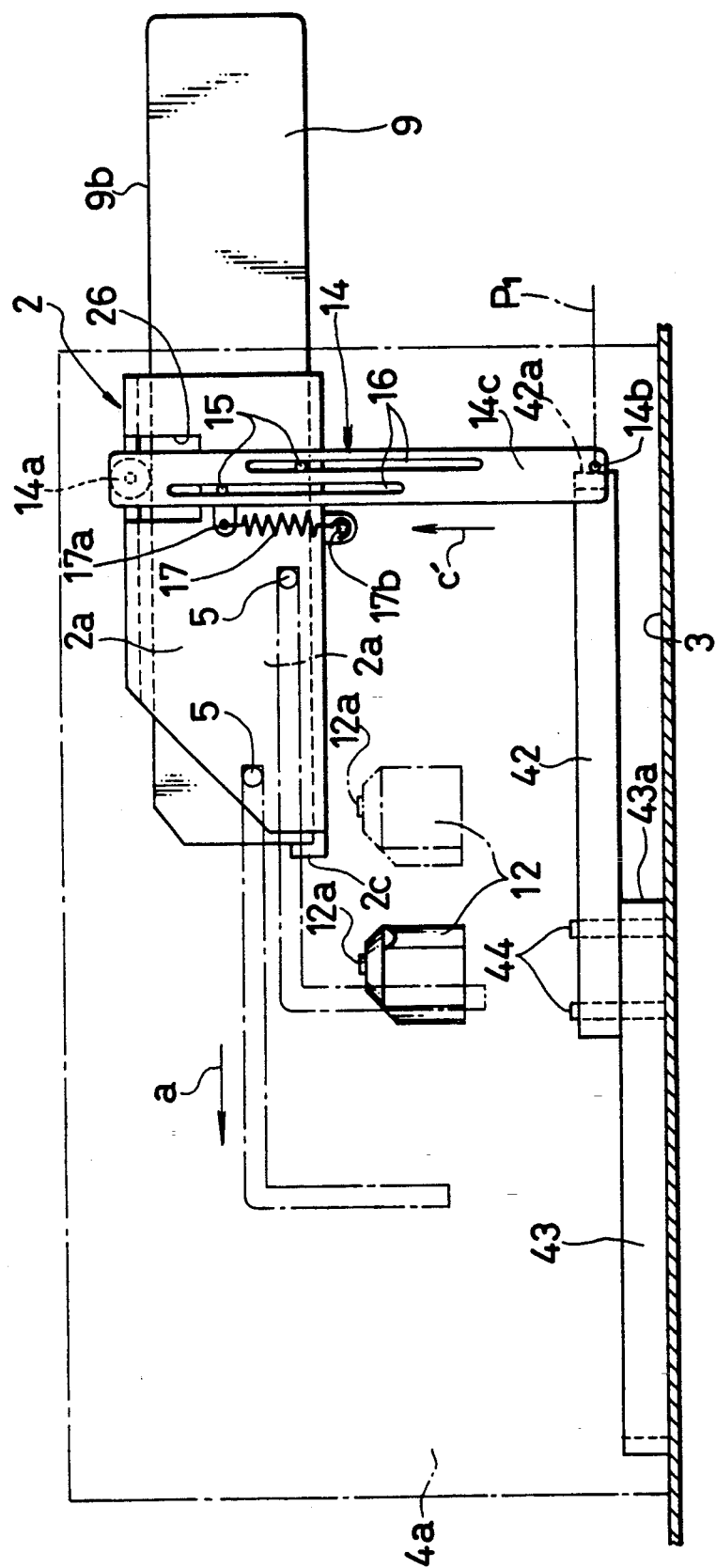
FIGS. 2A and 2B are schematic side elevation views which are partly in section, as viewed in the direction of the arrows IIA and IIB on FIGS. 1A and 1B, respectively.

When the large-sized cassette 9 is inserted in the direction of the arrow a on FIG. 2A into the cassette holder 2 disposed in the cassette receiving and discharging position, only small clearances remain between the opposite sides of the cassette 9 and the adjacent side walls 2a of the cassette holder, as shown in FIG. 1A. When the small-sized cassette 9 is similarly inserted into the cassette holder 2 in its cassette receiving and discharging position, as in FIG. 2B, relatively large spaces remain between the sides of the cassette 10 and the side walls 2a of the cassette holder, as shown in FIG. 1B. Although not shown in the drawings, a suitable arrangement is preferably provided for laterally guiding or centering the cassettes, and particularly the small-sized cassette 10, within the holder 2. For example, as specifically disclosed in U.S. Pat. No. 4,664,337, and U.S. Pat. No. 4,786,996, which have a common assignee herewith, such arrangement may comprise a groove or grooves in the bottom surface of each of the cassettes 9 and 10, with each of such grooves slidably receiving a correspondingly located ridge projecting upwardly from the bottom surface of the cassette holder 2 and extending parallel with the side walls 2a.

The tape cassette recording and/or reproducing apparatus embodying this invention is further shown to comprise a pair of reel bases 12 which, as hereinafter described in detail, are movable relative to each other for varying the center-to-center distance between such reel bases so that the reels 9a or 10a of the large-sized cassette 9 or of the small-sized cassette 10 will engage over the respective reel bases 12 when the cassette 9 or 10 is conveyed to the cassette loading position by the cassette holder 2.

Figure 2B:
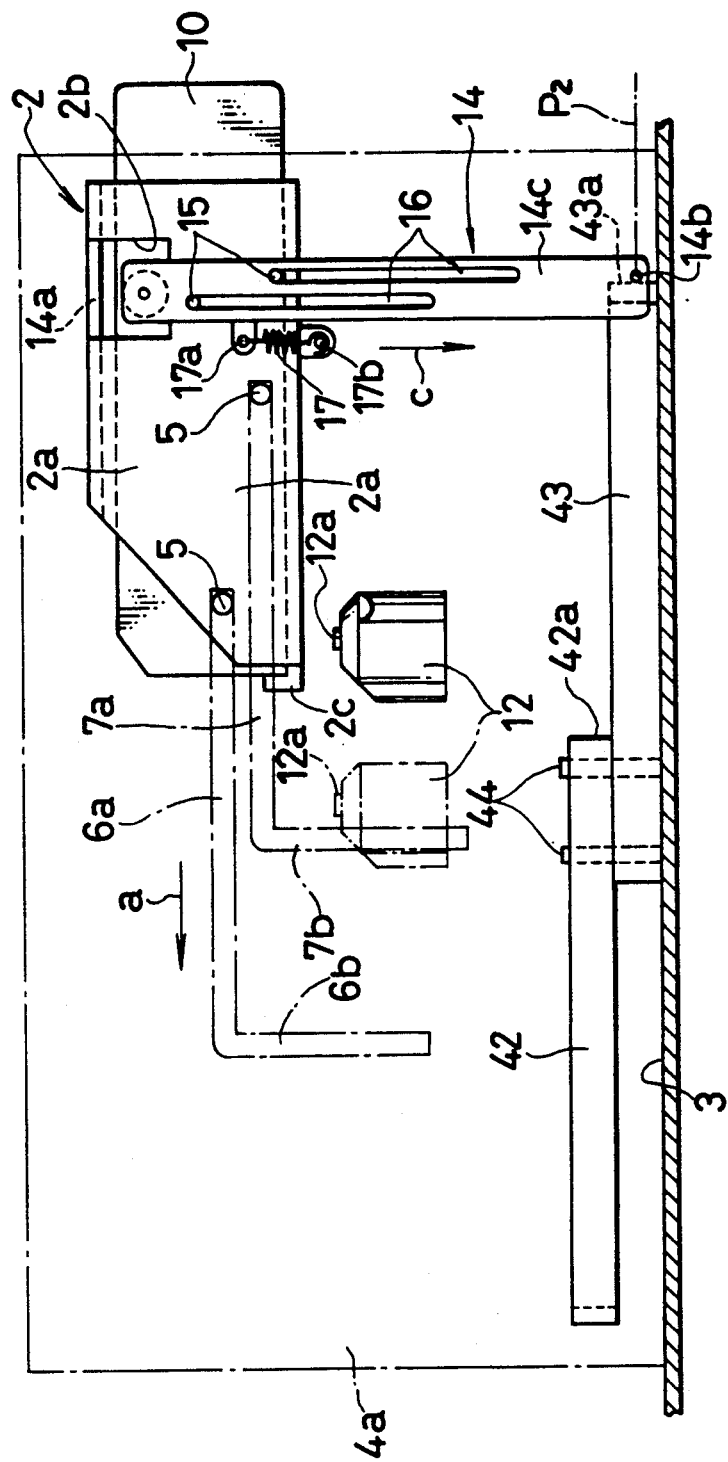

A detecting device 14 (FIGS. 1A–3B) is provided to detect the size of a cassette when either the large-sized cassette 9 or the small-sized cassette 10 is slidably inserted into the cassette holder 2 with the latter disposed in its cassette receiving and discharging position (FIGS. 1A, 2A and 2B). In the illustrated embodiment of the invention, the detecting device 14 is shown to include a vertically elongated slide member 14c disposed outside the side wall 2a of the holder 2 which is adjacent the supporting side plate 4a (FIGS. 1A and 1B). The slide member 14c is mounted for horizontal movement with the cassette holder 2 while being vertically movable relative to the cassette holder, for example, by means of guide pins 15 extending from the adjacent side wall 2a of the cassette holder 2 and being slidably engaged in elongated vertical slots 16 extending longitudinally in the slide member 14c. A tension spring 17 is connected between an anchor tab 17a extending from the slide member 14c and an anchor tab 17b at the bottom of the cassette holder 2 for yieldably urging the slide member 14c in the downward direction relative to the cassette holder 2, for example, to the position shown on FIG. 2B in which the upper ends of the slots 16 engage against the guide pins 15. The detecting device 14 is further shown to include a cassette sensing member in the form of a roller 14a mounted at the upper end of the slide member 14c and extending laterally inward therefrom through a cutout 2b opening upwardly in the adjacent side wall 2a of the cassette holder (FIGS. 1B, 2A and 2B).

When a large-sized cassette 9 is horizontally inserted in the direction of the arrow a on FIG. 2A into the cassette holder 2 in its cassette receiving and discharging position, as shown on FIGS. 1A and 2A, the fact that the large-sized cassette 9 extends laterally across substantially the entire distance between the side walls 2a of the cassette holder 2 results in the sensing roller 14a riding on a top surface 9b of the cassette 9 with the result that the slide member 14c is displaced in the direction of the arrow c' on FIG. 2A against the force of the spring 17 to an upper position which indicates the presence of a large-sized cassette 9 in the cassette holder 2. On the other hand, when a small-sized cassette 10 is horizontally inserted into the cassette holder 2, in its cassette receiving and discharging position, as shown in FIGS. 1B and 2B, the sides of the cassette are spaced substantially inward from the side walls 2a of the cassette holder so that the top surface of the cassette 10 does not engage under the roller 14a and the spring 17 retains the slide member 14c of the detecting device 14 in its lower position shown on FIG. 2B for indicating that a small-sized cassette 10 has been inserted.

Figure 5B:
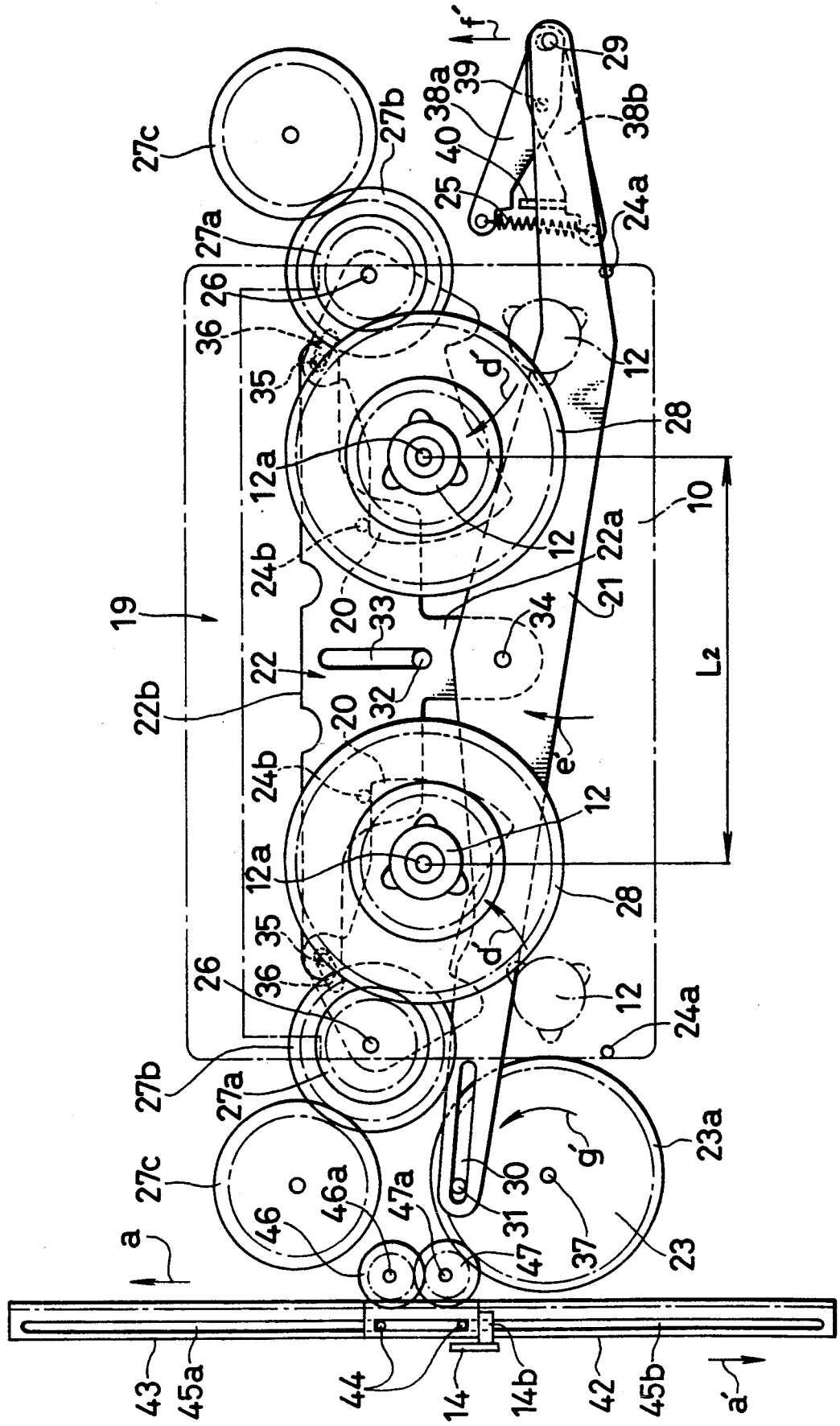

The cassette loading device 1 of a tape cassette recording and/or reproducing apparatus embodying this invention further comprises a reel base adjusting mechanism 19 (FIGS. 1A, 1B, 5A and 5B) which is selectively driven in a first mode for moving the reel bases 12 to first positions shown in full lines on FIGS. 1A and 5A in which the center-to-center distance $L_1$ between the reel bases 12 is equal to the center-to-center distance $l_1$ between the reels 9a of a large-sized cassette 9 so as to be engageable with such reels when the relatively large-sized cassette 9 is conveyed by the holder 2 to the loading position. Alternatively, the reel base adjusting mechanism 19 is selectively driven in a second mode for moving the reel bases 12 to second positions shown in full lines on FIGS. 1B and 5B, and in which the center-to-center distance $L_2$ between the reel bases 12 is equal to the center-to-center distance $l_2$ between the reels 10a of a small-sized cassette 10 so as to be engageable with the reels 10a of a cassette 10 conveyed by the holder 2 to the loading position.

Furthermore, in accordance with the invention, a drive member which, in the illustrated embodiment of the invention, is constituted by a pin 14b directed laterally inward from the lower end of the slide member 14c, is movable with the cassette holder 2 at least part of the way from the cassette receiving and discharging position toward the loading position, is responsive to whether the detecting device 14 is in its upper or lower position for driving the reel base adjusting mechanism 19 in its previously described first and second modes, respectively. Therefore, the reel bases 12 are disposed in either their first or second positions, respectively, when the cassette holder 2 conveys a relatively large-sized cassette 9 or a relatively small-sized cassette 10, respectively, to the loading position. More specifically, when the cassette holder 2 is moved horizontally with a large-sized cassette 9 therein from the cassette receiving and discharging position of FIG. 2A to the intermediate or inserted cassette position shown in full lines on 3A, the slide member 14c of the detecting device 14 and the drive member or pin 14b at its lower end are also moved horizontally in the direction of the arrow a together with the cassette holder 2. In the course of such horizontal movement of the slide member 14c, the displacement of the slide member 14c upwardly in the direction of the arrow c' on FIG. 2A by the engagement of the sensing roller 14a with the top surface 9b of the large-sized cassette 9 maintains the drive pin 14b at a relatively raised position or level $P_1$ for driving the reel base adjusting mechanism 19 in its first mode which increases the center-to-center distance between the reel bases 12 to the dimension $L_1$ (FIG. 5A) which is suitable for engagement of the reel bases with the reels 9a of the cassette 9 when the latter arrives at the loading position.

On the other hand, if a small-sized cassette 10 is inserted in the cassette holder 2, the spring 17 maintains the slide member 14c and the drive pin 14b at the lower position or level $P_2$ so that, during movement of the holder 2 to its inserted position, the drive pin 14b drives the reel base adjusting mechanism 19 in its second mode for decreasing the center-to-center distance between the reel bases 12 to the dimension $L_2$ (FIG. 5B) which is suitable for engagement of the reel bases with the reels 10a of the cassette 10 when the latter arrives at the loading position.

Figure 3A:
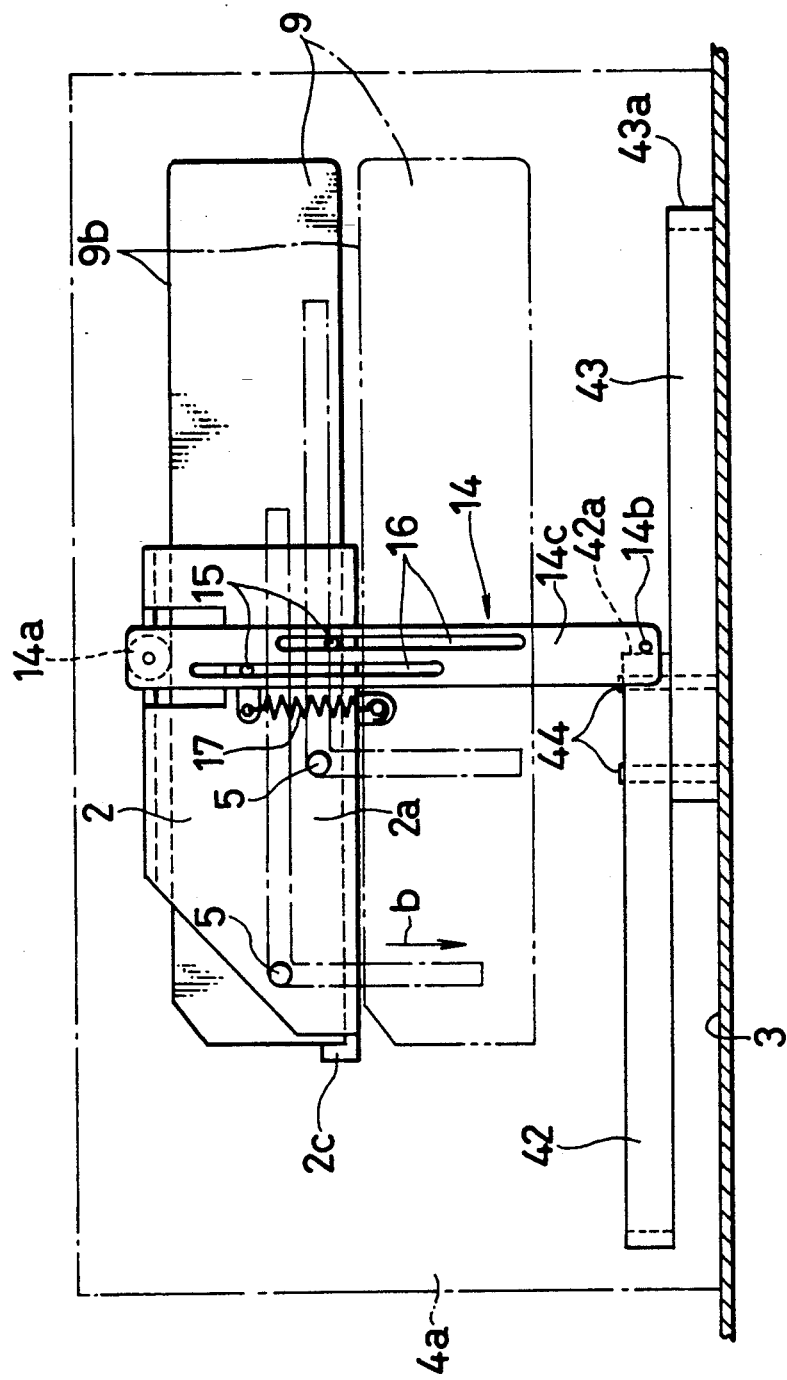

After the cassette holder 2 attains the intermediate or inserted cassette position shown in full lines on FIG. 3A, the cassette holder 2 is moved downwardly in the direction of the arrow b to the cassette loading position. During such downward movement of the cassette holder 2, for example, as a result of the rolling engagement of the motor driven pinion 102 with the gear rack portion 103b, the guide pins 15 on the cassette holder 2 are moved downwardly, that is, in the direction of the arrow b on FIG. 3A, within the elongated slots 16 of the slide member 14c to permit the final movement of the cassette holder 2 with the large-sized cassette 9 or the small-sized cassette 10 therein to the loading position without corresponding vertical movements of the slide member 14a or of the driving pin 14b thereon. It will be appreciated that for an unloading and ejecting or discharging operation, the above described movements of the cassette holder 2 are reversed. Thus, the operation of the motor 100 in the direction for an unloading and ejecting operation first causes the pinion 102 to roll upwardly along the vertical portion 103b of the gear rack 103 with the result that the cassette holder 2, with the cassette 9 or 10 therein, is raised from its loading position shown in dot-dash lines on FIG. 3A or FIG. 3B to the intermediate position shown in full lines. During such upward removal of the cassette 9 or 10, its reels 9a or 10a are disengaged from the reel bases 12 while the spring 17 maintains the slide member 14c in the position shown on FIGS. 3A or 3B, respectively.

When the cassette holder 2 attains the intermediate position shown in full lines on FIGS. 3A or 3B, the motor driven pinion 102 moves from the vertical gear rack portion 103b to the horizontal gear rack portion 103a (FIG. 4) and rolls therealong for returning the cassette holder 2 to its cassette receiving and discharging position shown on FIG. 2A. Thereafter, the cassette 9 or 10 can be manually withdrawn from the cassette holder 2. Upon such withdrawal of the large-sized cassette 9, the sensing roller 14a is released so that the spring 17 is then operative to return the slide member 14c to its lower position shown on FIG. 2B with the driving pin 14b being then at the lower position or level $P_2$.

The reel base adjusting mechanism 19 will now be described in detail with reference to FIGS. 1A, 1B, 5A and 5B. As there shown, the reel base adjusting device 19 generally comprises a pair of reel base supporting members 20 on which the reel bases 12 are respectively rotatably mounted, a motion transmitting assembly including an angularly movable lever 21 mounted on a floating pivot 29 and a connecting member 22 for transmitting angular movements of the lever 21 to each of the reel base supporting members 20, a crank wheel 23 for effecting angular movements of the lever 21, outer and inner stops 24a and 24b extending from the chassis 3 and engageable by the reel base supporting members 20 for defining the maximum and minimum distances $L_1$ and $L_2$, respectively, to be established between the centers of the reel bases 12, and a spring 25 which, as hereinafter describe in detail, is loaded when the stops 24a or 24b limit the movements of the reel bases 12 either away from each other or toward each other, respectively, with the result that a force exerted by the loaded spring 25 on the floating pivot 29 ensures precise locating of the reel bases 12 at the desired positions thereof for engagement with the reels within either a large-sized cassette 9 or a small-sized cassette 10.

Figure 8:
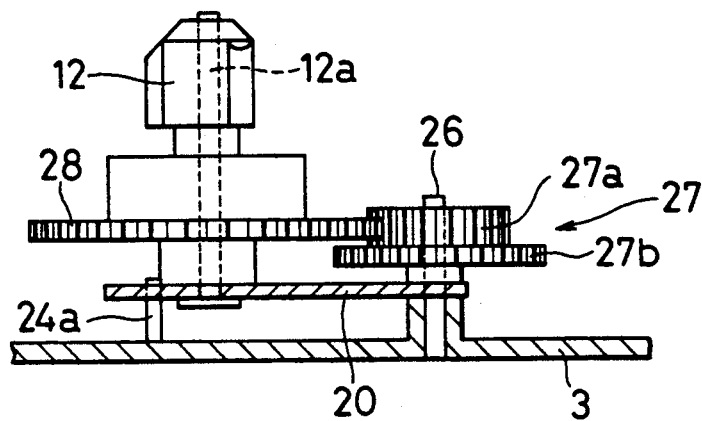
FIG. 8 is a detailed sectional view taken along the line VIII—VIII on FIG. 5A for illustrating one of the reel bases and the mounting thereof.

Each reel-base supporting member 20 is desirably constituted by a horizontally extending, elongated plate which, at one end, is swingably mounted on an upstanding pivot 26 secured to the chassis 3, while the respective reel base 12 is rotatably mounted on a spindle 12a projecting upwardly from the free end portion of the supporting member 20. For effecting rotation of each reel base 12, a gear member 27 including a relatively small diameter gear portion 27a and a relatively large diameter gear portion 27b is rotatable on the respective pivot 26, and the relatively small gear portion 27a is in meshing engagement with a reel-base gear 28 which is rotatably coupled with the respective reel base 12 for rotation on the spindle 12a (FIG. 8). Further, as shown on FIGS. 5A and 5B, the large diameter gear portion 27b of each of the gear members 27 meshes with a respective gear 27c which is suitably driven by a reel motor (not shown). It will be appreciated that the foregoing arrangement for driving the reel bases 12 ensures that the reel bases can be driven when they are positioned for engagement with the reels of a large-sized cassette 9, as well as when the reel bases 12 are positioned for engagement with the reels of a small-sized cassette 10.

The lever 21 extends in a horizontal plane between the supporting side plates 4a and 4b (FIG. 1A) and has the floating pivot 29 depending from one of its ends, while the opposite end portion of the lever 21 is formed with an elongated slot 30 therein which slidably receives a crank pin 31 directed upwardly from the peripheral portion of the crank wheel 23. The connecting member 22 is shown to be T-shaped (FIGS. 5A and 5B) so as to include a stem portion 22a extending from the center of a head portion 22b. An elongated slot 33 is centered in the head portion 22b and extends in the direction of the stem portion 22a for slidably receiving a guide pin 32 which projects upwardly from the chassis 3. The stem portion 22a of the connecting member 22 is pivotably connected at its free end, as by a pin 34, to the central portion of the lever 21, and the ends of the head portion 22b of the connecting member have respective pins 35 projecting therefrom and being slidably received in elongated holes 36 formed in the adjacent reel base supporting members 20.

The crank wheel 23 is shown to be rotatably mounted on an axle 37 projecting upwardly from the chassis 3 and, as hereinafter described in detail, is turned about the axle 37 through an angle $\Theta_1$ which is greater than 180 degrees between the position shown on FIG. 5A and in full lines on FIG. 6 and which is characteristic of the positioning of the reel bases 12 with the relatively large center-to-center distance $L_1$ therebetween, and the position shown on FIG. 5B and in dot-dash lines on FIG. 6 and which is characteristic of the positioning of the reel bases 12 with the relatively small center-to-center distance $L_2$ therebetween.

Figure 9:
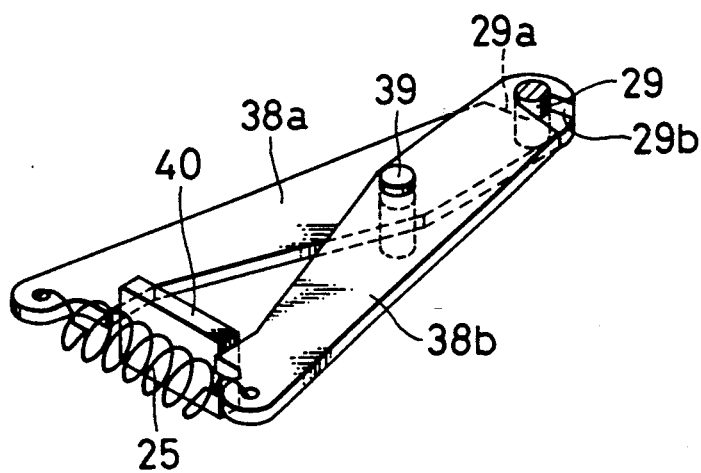
FIG. 9 is an enlarged perspective view of a device providing a spring-stabilized floating pivot for a lever included in the transmission assembly of FIG. 6.

As earlier stated, the pivot 29 for the lever 21 floats or is adapted to be displaced from a normal position shown on FIG. 6 against the resistance of the spring 25. More particularly, as shown on FIG. 9, a mechanism for supporting the pivot 29 so as to permit the floating thereof includes a pair of support links 38a and 38b which are angularly movable in a scissor-like arrangement about a common fixed pivot 39 which extends from the chassis 3 and is disposed intermediate the ends of the links 38a and 38b. The spring 25 is in the form of a tension spring connected, at its ends, to the links 38a and 38b at one end of the latter so as to urge the respective ends of the links 38a and 38b against opposite sides of a stop member 40 which extends fixedly upward from the chassis 3 between the ends of the links 38a and 38b connected with the spring 25. The end portions of the links 38a and 38b remote from the spring 25 are formed with oppositely laterally opening cutouts 29a and 29b, respectively, which have registering inner portions to define a socket receiving the pivot 29 depending from lever 21. It will be appreciated that the pivot 29 of the lever 21 is resiliently held by the force of the spring 25 at a normal position defined by the engagement of both links 38a and 38b with the respective sides of the stop 40.

As shown in FIGS. 5A and 6, when the crank wheel 23 is turned in the direction of the arrow g, the lever 21 driven by the crank pin 31 is made to swing in the direction of the arrow e about the pivot 29 and, as a result thereof, the reel base supporting members 20 are turned by the connecting member 22 in the directions of the arrows d about the respective pivots 26 until the reel base supporting members 20 abut against the respective stops 24a for establishing the distance $L_1$ between the centers of the reel bases 12 which coincides with the distance $l_1$ between the centers of the reels of the large-sized cassette 9. On the other hand, and as shown in FIGS. 5B and 6, when the crank wheel 23 is turned in the direction of the arrow g', the lever 21 is driven by the crank pin 31 to swing in the direction of the arrow e' about the pivot 29 and, as a result thereof, the reel base supporting members 20 are turned by connecting member 22 in the directions of the arrows d' about the pivots 26 so as to abut against the respective stops 24b and thereby ensure that the distance $L_2$ between the centers of the reel bases 12 will coincide with the distance $l_2$ between the centers of the reels of the small-sized cassette 10.

As shown on FIG. 6, in each of the cases described above, the crank pin 31 on the crank wheel 23, in moving through the angle $\Theta_1$ greater than 180 degrees, is moved in the direction of the arrow g or g' an angular distance $\Theta_2$ beyond the dead center positions D and D' which correspond to the maximum angular displacement of the lever 21 so that inadvertent reverse turning of the crank wheel 23 is prevented. In order to achieve the foregoing, and as shown in FIG. 6, the various described components of the reel base adjusting mechanism 19 are relatively dimensioned so that, in response to turning of the crank wheel 23 through the angle $\Theta_1$, the angle $\Theta_3$ of displacement of the lever 21 about the pivot 29 is larger than the angle $\Theta_4$ included between lines drawn from the pivot 29 to the positions of the connecting pin 34 shown in full lines and in dot-dash lines on FIG. 6 and which are determined by the engagement of the reel base supporting members 20 against the stops 24a and 24b, respectively.

Thus, as shown in FIGS. 5A and 5B, the reel base supporting members 20 abut against the respective stops 24a or 24b when moving in the directions of the arrows d or d', respectively, before the crank pin 31 has completed its movement through the angle $\Theta_1$. Therefore, during the final increment of angular movement of the pin 31 through the angle $\Theta_1$, the pivot 29, which is normally closely embraced by the cutouts 29a and 29b of both links 38a and 38b, is displaced in the direction opposed to the force of the spring 25 indicated by the arrow f or f', respectively. Thus, at the completion of the angular movement of the crank wheel 23 through the angle $\Theta_1$ in the direction of the arrow g or g', the force of the spring 25 acts through one or the other of the links 38a and 38b on the pivot 29, and thence through the lever 21 and connecting member 22 for resiliently urging the reel base supporting members 20 against the respective stops 24a or 24b. As a result of the foregoing, the reel bases 12 are reliably maintained with the desired center-to-center distance $L_1$ or $L_2$ therebetween. Further, since the crank pin 31 is beyond the dead center position D or D' at the completion of its angular movement through the angle $\Theta_1$, the initial return movement of the crank pin 31 through the angle $\Theta_2$ is yieldably opposed by the force of spring 25 for preventing inadvertent return turning of the crank wheel 23.

Although the reel base adjusting mechanism 19 described above effects angular displacements of the reel base supporting members 20 for changing the center-to-center distances between the reel bases 12, it will be appreciated that the present invention can also be applied to an arrangement in which the reel base supporting members 20 are rectilinearly movable for achieving the desired change in the center-to-center distance between the reel bases.

Figure 7A:
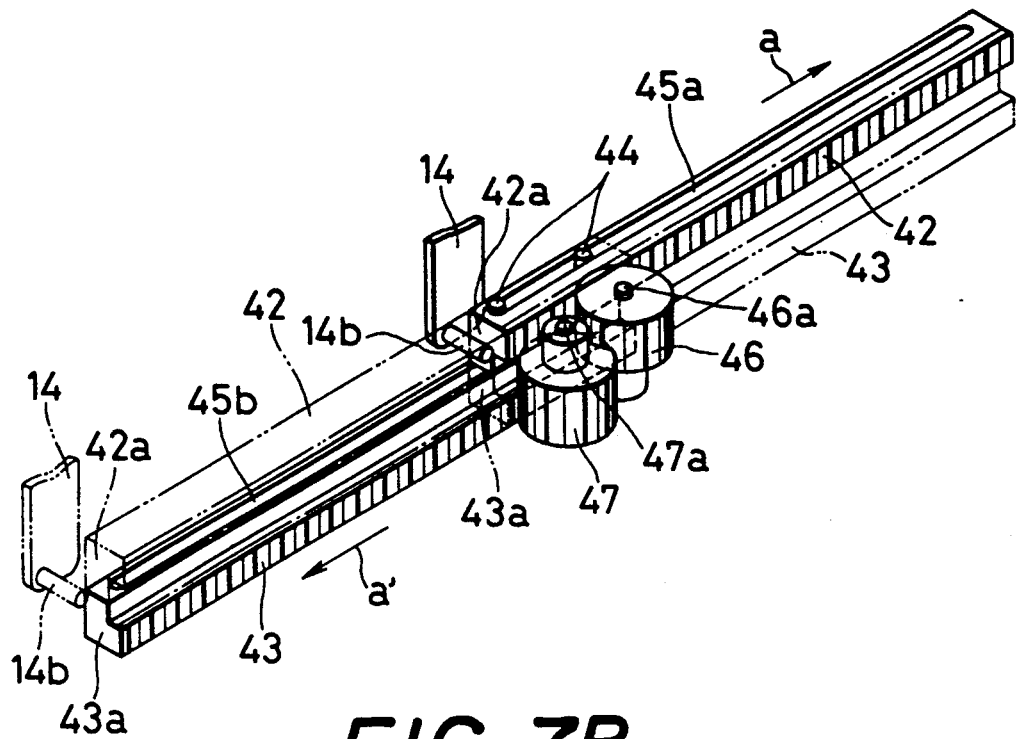
FIGS. 7A and 7B are perspective views of gear racks and pinions included in the reel base adjusting device of FIGS. 5A and 5B and respectively showing the operations thereof when a relatively large-sized cassette or a relatively small-sized cassette is detected in the cassette holder.
Figure 7B:
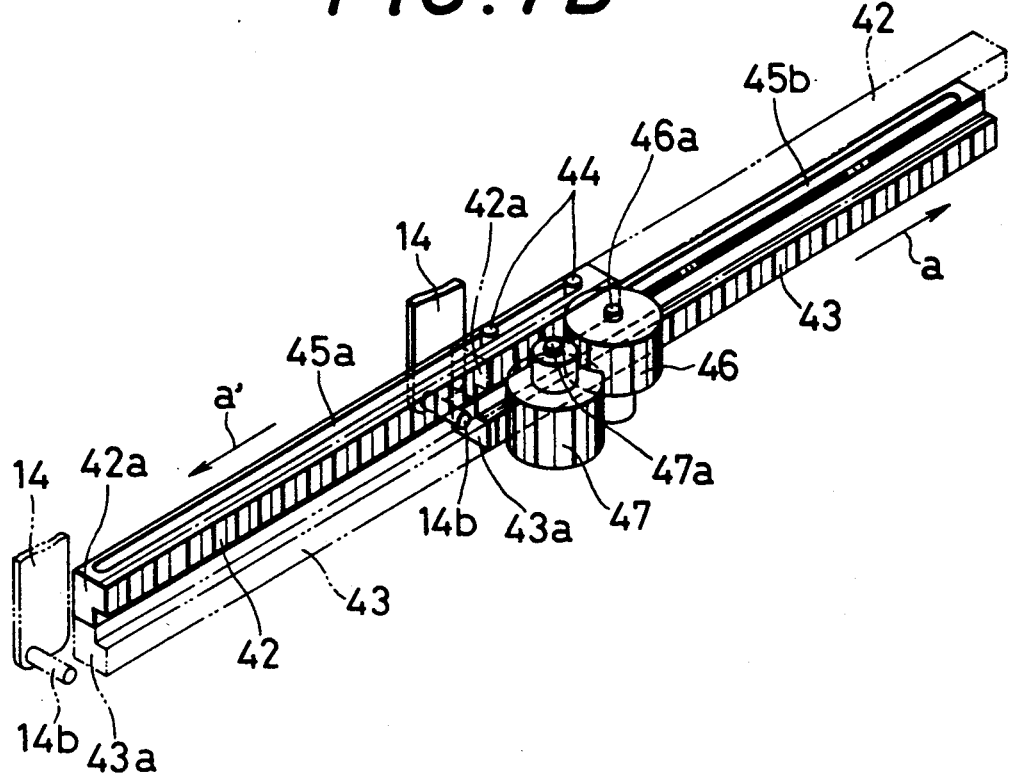

Continuing with the description of the illustrated embodiment of the invention, it will be seen that the reel base adjusting mechanism 19 further comprises a pair of gear racks 42 and 43 extending horizontally on the chassis 3 of the inside of the supporting side plate 4a, with the gear rack 42 being superposed or arranged above the gear rack 43, as particularly shown on FIGS. 7A and 7B. The gear racks 42 and 43 have longitudinal slots 45a and 45b, respectively, therein which slideable receive guide pins 44 projecting upwardly from the chassis 3. Thus, the gear racks 42 and 43 are mounted for sliding movements parallel to the plane of the adjacent supporting side plate 4a in the directions of the arrows a and a'. As is apparent on FIGS. 2A, 2B, 3A and 3B, the superposed upper and lower paths in which the gear racks 42 and 43, respectively, are rectilinearly moveable extend parallel with the horizontal portion of the path of movement of the cassette holder 2 between its cassette receiving and discharging position (FIGS. 2A and 2B) and its intermediate position (shown in full lines on FIGS. 3A and 3B).

As shown on FIGS. 2A and 3A, when the drive pin 14b is at its upper position or level $P_1$ in response to the presence of a large-sized cassette 9 in the cassette holder 2, the drive pin 14b is at the level of the gear rack 42 and is engageable against an end surface 42a thereof for driving the gear rack 42 in the direction of the arrow a during the movement of the slide member 14c with the holder 2 in that direction. Similarly, as shown on FIGS. 2B and 3B, when the drive pin 14b is at its lower position $P_2$ in response to the presence of a small-sized cassette 10 in the cassette holder 2, the drive pin 14b is at the level of the gear rack 43 and is engageable against an end surface 43a thereof for driving the gear rack 43 in the direction of the arrow a during the movement of the slide member 14c with the cassette holder 2 in that direction.

In order to constrain the gear racks 42 and 43 to move in opposed directions in their respective superposed paths, the gear racks 42 and 43 are in meshing engagement with pinions 46 and 47, respectively, which are rotatable on shafts 46a and 47a, respectively, projecting upwardly from the chassis 3. The pinions 46 and 47 have equal diameters and are in meshing engagement with each other, and the pinion 47 is further in meshing engagement with a crank gear 23a defined by teeth formed on the periphery of the crank wheel 23.

The above described cassette loading device 1 according to an embodiment of this invention operates as follows:

If the reel bases 12 ar initially in their second positions, that is, with the relatively small center-to-center distance $L_2$ therebetween, as on FIG. 5B, so as to be adapted for engagement with the reels 10a of a relatively small-sized cassette 10, the gear racks 42 and 43 are relatively disposed as shown on FIG. 2A. Thereupon, the insertion of a large-sized cassette 9 into the holder 2 in the direction of the arrow a will cause the top surface 9b of the cassette to engage the sensing roller 14a and thereby raise the slide member 14c to its upper position with the drive pin 14b being disposed at its level $P_1$. Thereafter, when the cassette holder 2 is horizontally moved in the direction of the arrow a, for example, by suitable operation of its drive motor 100 so as to move the holder from the cassette receiving and discharging position (FIG. 2A) to its intermediate or cassette inserted position (shown in full lines on FIG. 3A), the slide member 14c moves with the holder 2 in the direction of the arrow a while the drive pin 14b at the level $P_1$ engages the end surface 42a of the upper rack 42 for also moving the latter in the direction of the arrow a, as shown on FIG. 7A. At the same time, and by reason of the meshing engagement of the pinions 46 and 47 With the gear racks 42 and 43 and with each other, the lower rack 43 is moved in the opposite direction, that is, in the direction of the arrow a' on FIG. 7A. The movement of the upper rack 42 in the direction of the arrow a on FIG. 7A causes rotation of the pinion 46 in the clockwise direction, as viewed on FIG. 5A, so that the pinion 47 rotates in the counterclockwise direction and the crank gear 23a on the crank wheel 23 is turned in the direction of the arrow g. The various elements are dimensioned so that, upon linear displacement of the upper gear rack 42 from the position shown on FIG. 2A to the position shown on FIG. 3A in response to the movement of the cassette holder 2 from its cassette receiving and discharging position to its intermediate position, the crank wheel 23 will be turned in the direction of the arrow g through the desired angle $\Theta_1$ of more than 180 degrees. As earlier noted, in response to such turning of the crank wheel 23, the reel base adjusting mechanism 19 is effective to automatically move the reel bases 12 in the directions of the arrows d (FIG. 5A) so as to establish the desired distance $L_1$ between the centers thereof. During the final movement of the cassette holder 2 in the direction of the arrow b on FIG. 3A from the intermediate position shown in full lines to the loading position shown in dot-dash lines, the slide member 14c remains substantially immobile with the pins 15 extending from the cassette holder 2 sliding downwardly along the slots 16. Thus, when the cassette holder 2 arrives at its loading position with a large-sized cassette 9 therein, the reel bases 12 are already positioned for engagement with the reels 9a of that cassette.

During a return movement of the cassette holder 2 from its loading position to the cassette receiving and discharging position with a large-sized cassette 9 therein, the gear racks 42 and 43 remain in the positions shown on FIG. 3A, with the result that the reel bases 12 remain in the first positions thereof shown on FIG. 5A, that is, remain adapted for engagement with the reels of a large-sized cassette. Therefore, if one large-sized cassette is exchanged for another large-sized cassette upon the return of the cassette holder 2 to its cassette receiving and discharging position, the next movement of the cassette holder 2 to its loading position will occur without any movements of the gear racks 42 and 43, and hence without any adjustments of the reel bases 12 which are already positioned for engagement with the reels of a large-sized cassette.

As shown in FIG. 2B, if a small-sized cassette 10 is inserted in the cassette holder 2 at its cassette receiving and discharging position, the sensing roller 14a is not engaged by the top of the cassette 10 so that the spring 17 is effective to retain the slide member 14c of the detecting device 14 in its lower position with the drive pin 14b at the lower level $P_2$. If the reel bases 12 have been previously disposed in their first positions shown on FIG. 5A with the center-to-center distance $L_1$ therebetween, that is, for engagement with the reels of a large-sized cassette, the gear racks 42 and 43 are positioned as shown on FIG. 2B, that is, with the end 43a of the gear rack 43 proximate to the drive pin 14b at the lower level $P_2$. Therefore, when the cassette holder 2 is moved horizontally in the direction of the arrow a on FIG. 2B from its cassette receiving and discharging position to its intermediate position shown in full lines on FIG. 3B, the drive pin 14b abutting against the end surface 43a of the lower rack 43 propels the latter in the direction of the arrow a on FIG. 7B to the position shown in full lines thereon. Simultaneously, by reason of the pinions 46 and 47 meshing with the gear racks 42 and 43 and with each other, the upper gear rack 42 is moved in the direction of the arrow a' to the position shown in full lines on FIG. 7B. The movement of the lower gear rack 43 in the direction of the arrow a on FIG. 5B causes the pinion 47 to rotate in the clockwise direction and, by reason of the meshing engagement of the pinion 47 with the crank gear 23a, the crank wheel 23 is turned in the direction of the arrow g' (FIG. 5B) through the desired angle of more than 180 degrees. In response to such turning of the crank wheel 23, the reel base adjusting mechanism 19 is effective to move the reel bases 12 to their second positions shown on FIG. 5B, and in which the resulting center-to-center distance $L_2$ is adapted for engagement with the reels 10a of the small-sized cassette when the latter is conveyed to the loading position by the cassette holder 2.

It will be appreciated that, in the above described cassette loading device 1 of a tape cassette recording and/or reproducing apparatus embodying this invention, the upper and lower gear racks 42 and 43 are selectively driven by the drive pin 14b which extends from the cassette size detecting device 14 moving with the cassette holder 2 from the cassette receiving and discharging position to the intermediate or cassette inserted position and, as a result, the distance between the reel bases 12 is automatically adjusted to correspond to the center-to-center distance between the reels of a selected cassette inserted in the cassette holder. Thus, the reel bases 12 are automatically properly positioned for engagement with the reels 9a of a large-sized cassette 9 or with the reels 10a of a small-sized cassette 10 when either of such cassettes is conveyed to the loading position by the cassette holder 2. It is important to note that, in the described device embodying this invention, the motor 100 or other source of power employed for moving the cassette holder 2 from its cassette receiving and discharging position to its loading position is also employed for adjusting the distance between the reel bases 12, that is, there is no need to provide an additional motor or power source for the sole purpose for suitably adjusting the distance between the reel bases 12. Thus, the apparatus embodying the present invention can be relatively simplified for reducing its production costs.

Although the gear racks 42 and 43 have been shown superposed or arranged one above the other, other arrangements of the gear racks may be employed. For example, the gear racks 42 and 43 may be arranged for movements in laterally spaced apart parallel paths with the rack 43 having teeth on both sides, and with the pinion 46 being arranged between the gear racks 42 and 43 for meshing engagement with the teeth of the rack 42 and the teeth at one side of the rack 43, thereby to ensure that the gear racks 42 and 43 move in opposed directions. In such modified arrangement, the pinion 47 is then in meshing engagement with the crank gear 23a and with the teeth at the side of the gear rack 43 facing away from the gear rack 42. Of course, in the case of the arrangement having the gear racks 42 and 43 movable in opposite directions in laterally spaced apart parallel paths, the cassette size detecting device 14 is suitably arranged to laterally displace the drive pin 14b for selective engagement with one or the other of the gear racks during the movement of the cassette holder 2 from its cassette receiving and discharging position to its intermediate or cassette inserted position with either a large-sized cassette or a small-sized cassette in the cassette holder.

Although this invention is desirably applicable to cassette-type video tape recorders, it will be appreciated that the invention may be similarly applied to other kinds of recording and/or reproducing apparatuses in which cassette tapes are employed.

Having described an illustrative embodiment of the invention with reference to the accompanying drawings, it is to be understood that the invention is not limited to that precise embodiment or the specifically described modifications thereof, and that various changes and further modifications may be effected therein by one skilled in the art without departing from the scope or spirit of the invention as defined in the appended claims.

What is claimed is:

1. A tape cassette recording and/or reproducing apparatus capable of selective operation with a relatively large-sized cassette and a relatively small-sized cassette having relatively large and small widths, respectively, and containing respective pairs of rotatable reels which, in said large-sized cassette, have a first relatively large center-to-center distance and, in said small-sized cassette, have a second relatively small center-to-center distance, said apparatus comprising:

a cassette holder movable between a cassette receiving and discharging position and a loading position and being operative to receive a selected one of said relatively large-sized and small-sized cassette when in said cassette receiving and discharging position and to convey the selected cassette therewith to said loading position;

means guiding said cassette holder to move in a path having a horizontal portion extending from said cassette receiving and discharging position to an intermediate position and a vertical portion extending from said intermediate position to said loading position;

a pair of reel bases movable relative to each other for varying the center-to-center distance between said reel bases;

reel base adjusting means selectively driven in a first mode for moving said reel bases to first positions in which said center-to-center distance therebetween is equal to said first center-to-center distance so as to be engageable with the reels of a relatively large-sized cassette conveyed by said cassette holder to said loading position, and in a second mode for moving said reel bases to second positions in which said center-to-center distance therebetween is equal to said second center-to-center distance so as to be engageable with the reels of a relatively small-sized cassette conveyed by said cassette holder to said loading position, said reel base adjusting means completing movements of said reel bases to said first positions or said second positions thereof during movement of said cassette holder along said horizontal path portion to said intermediate position;

detecting means for detecting the size of a cassette received in said cassette holder in said cassette receiving and discharging position and which selects first and second conditions when detecting said relatively large-sized and relatively small-sized cassettes, respectively; and drive means propelled by said cassette holder and movable with said cassette holder during movement of said cassette holder only between said cassette receiving and discharging position and said intermediate position and being responsive to said first and second conditions of said detecting means for driving said reel base adjusting means in said first and second modes, respectively, and thereby disposing said reel bases in said first and second positions, respectively, thereof when said cassette holder conveys a relatively large-sized cassette or a relatively small-sized cassette, respectively, to said loading position.

2. A tape cassette recording and/or reproducing apparatus capable of selectively operation with a relatively large-sized cassette and a relatively small-sized cassette having relatively large and small widths, respectively, and containing respective pairs of rotatable reels which, in said large-sized cassette, have a first relatively large center-to-center distance and, in said small-sized cassette, have a second relatively small center-to-center distance, said apparatus comprising:

a cassette holder movable between a cassette receiving and discharging position and a loading position and being operative to receive a selected one of said relatively large-sized and small-sized cassettes when in said cassette receiving and discharging position and to convey the selected cassette therewith to said loading position;

means guiding said cassette holder to move in a path having a rectilinear portion extending from said cassette receiving and discharging position to an intermediate position and a right-angled portion extending from said intermediate position to said loading position;

a pair of reel bases movable relative to each other for varying the center-to-center distance between said reel bases;

reel base adjusting means selectively driven in a first mode for moving said reel bases to first positions in which said center-to-center distance therebetween is equal to said first center-to-center distance so as to be engageable with the reels of a relatively large-sized cassette conveyed by said cassette holder to said loading position, and in a second mode for moving said reel bases to second positions in which said center-to-center distance therebetween is equal to said second center-to-center distance so as to be engageable with the reels of a relatively small-sized cassette conveyed by said cassette holder to said loading position, said reel base adjusting means completing movements of said reel bases to said first positions or said second positions thereof during movement of said cassette holder along said rectilinear path portion to said intermediate position;

detecting means for detecting the size of a cassette received in said cassette holder in said cassette receiving and discharging position and which selects first and second conditions when detecting said relatively large-sized and relatively small-sized cassettes, respectively; and drive means propelled by said cassette holder and movable with said cassette holder during movement of said cassette holder only between said cassette receiving and discharging position and said intermediate position and being responsive to said first and second conditions of said detecting means for driving said reel base adjusting means in said first and second modes, respectively, and thereby disposing said reel bases in said first and second positions, respectively, thereof when said cassette holder conveys a relatively large-sized cassette or a relatively small-sized cassette, respectively, to said loading position.

3. A tape cassette recording and/or reproducing apparatus capable of selective operation with a relatively large-sized cassette and a relatively small-sized cassette having relatively large and small widths, respectively, and containing respective pairs of rotatable reels which, in said large-sized cassette, have a first relatively large center-to-center distance and, in said small-sized cassette, have a second relatively small center-to-center distance, said apparatus comprising:

a cassette holder movable between a cassette receiving and discharging position and a loading position and being operative to receive a selected one of said relatively large-sized and small-sized cassettes when in said cassette receiving and discharging position and to convey the selected cassette therewith to said loading position;

means guiding said cassette holder to move in a path having a horizontal portion extending from said cassette receiving and discharging position to an intermediate position and a vertical portion extending from said intermediate position to said loading position;

a pair of reel bases movable relative to each other for varying the center-to-center distance between said reel bases;

reel base adjusting means selectively driven in a first mode for moving said reel bases to first positions in which said center-to-center distance therebetween is equal to said first center-to-center distance so as to be engageable with the reels of a relatively large-sized cassette conveyed by said holder to said loading position, and in a second mode for moving said reel bases to second positions in which said center-to-center distance therebetween is equal to said second center-to-center distance so as to be engageable with the reels of a relatively small-sized cassette conveyed by said holder to said loading position, said reel base adjusting means completes movements of said reel bases to said first positions or said second positions thereof during movement of said cassette holder along said horizontal path portion to said intermediate position;

detecting means including a cassette sensing member for detecting the size of a cassette received in said cassette holder in said cassette receiving and discharging position and which selects first and second conditions when detecting said relatively large-sized and relatively small-sized cassettes, respectively;

drive means movable with said cassette holder only between said cassette receiving and discharging position and said intermediate position and being responsive to said first and second conditions of said detecting means for driving said reel base adjusting means in said first and second modes, respectively, and thereby disposing said reel bases in said first and second positions, respectively, thereof when said cassette holder conveys a relatively large-sized cassette or a relatively small-sized cassette, respectively, to said loading position, said drive means including a drive member mounted on said cassette holder for horizontal movement with said cassette holder and being vertically movable relative to said cassette holder, and spring means urging said drive member downwardly relative to said cassette holder to a lower position corresponding to said second mode of the reel base adjusting means, said cassette sensing member being mounted on said drive member so as to be engaged only by a relatively large-sized cassette received in said cassette holder for displacing said drive member against the force of said spring means to an upper position corresponding to said first mode of the reel base adjusting means; and means including a motor for moving said cassette holder from said cassette receiving and discharging position to said loading position so that said motor is also operable, through said cassette holder and said drive means, for driving said reel base adjusting means.

4. A tape cassette recording and/or reproducing apparatus according to claim 3; in which said drive member is vertically elongated and mounted at one side of said cassette holder, said cassette sensing member is disposed at the upper end of said drive member and extends laterally inward in respect to said one side of the holder, and said holder has a width approximating said large width of said relatively large-sized cassette so that said relatively large-sized cassette is proximate to said one side of the holder when received in the holder for engagement with said cassette sensing member, whereas, said relatively small-sized cassette, by reason of said relatively small width thereof, is substantially spaced from said one side of the holder when received in the holder so as to be clear of said cassette sensing member.

5. A tape cassette recording and/or reproducing apparatus according to claim 3; in which said reel base adjusting means includes first and second gear racks mounted for rectilinear movements in superposed upper and lower paths extending parallel with said horizontal portion of the path of movement of the cassette holder and being engageable by said drive member in said upper and lower-positions, respectively, for movement by said drive member with said cassette holder in moving along said horizontal portion of the path of said holder, gear means meshing with said gear racks for constraining said gear racks to move in opposite directions in said superposed paths, and means establishing said first mode when said first gear rack is engaged by said drive member and establishing said second mode when said second gear rack is engaged by said drive member.

6. A tape cassette recording and/or reproducing apparatus according to claim 5; in which said gear means include first and second pinions meshing with said first and second gear racks, respectively, and also meshing with each other; and in which said reel base adjusting means further includes a driven gear meshing with one of said first and second pinions to be turned in a first direction to a first position when said first gear rack is engaged and moved by said drive member and to be turned in a second direction to a second position when said second gear rack is engaged and moved by said drive member.

7. A tape cassette recording and/or reproducing apparatus according to claim 6; in which said reel base adjusting means further includes stop means for limiting movements of said reel bases at said first and second positions thereof, and transmission means urging said reel bases to move past said first and second positions thereof upon turning of said driven gear to said first and second positions, respectively, of the driven gear, said transmission means including spring means which is loaded when said stop means limit movements of said reel bases at either of said first and second positions thereof so that a force exerted by the loaded spring means ensures precise positioning of said reel bases at said first and second positions.

8. A tape cassette-recording and/or reproducing apparatus according to claim 7; in which said transmission means includes a crank pin extending from said driven gear, a lever having a slot along one end portion slidably receiving said crank pin, means mounting said lever at another end of said lever for angular movements about a pivot axis which is displaceable against said force exerted by said loaded spring means, and means including a connecting member coupled with said lever for moving said reel bases in response to said angular movements of the lever.

9. A tape cassette recording and/or reproducing apparatus according to claim 8; in which said driven gear is turned more than 180 degrees between said first and second positions thereof, and in which maximum angular movements of said lever and maximum loading of said spring means occur at positions of said driven gear spaced in said second and first directions of turning thereof from said first and second positions, respectively, of the driven gear, whereby inadvertent turning of said driven gear from said first or second position thereof is prevented.

10. A tape cassette recording and/or reproducing apparatus according to claim 8; in which said means mounting the lever at said other end includes a pair of support links in a scissor-like arrangement with a common fixed pivot intermediate their ends, said support links having pivot seats opening toward each other at one end of the links, a pivot pin extending from said other end of the lever and engaging in said pivot seats to define said pivot axis which is displaceable, and a stop member interposed between the other ends of said support links; and in which said spring means is a tension spring extending between said other ends of the support links for urging the latter against opposite sides of said stop member.

11. A tape cassette recording and/or reproducing apparatus capable of selective operation with a relatively large-sized cassette and a relatively small-sized cassette having relatively large and small widths, respectively, and containing respective pairs of rotatable reels which, in said large-sized cassette, have a first relatively large center-to-center distance and, in said small-sized cassette, have a second relatively small center-to-center distance, said apparatus comprising:

a cassette holder movable between a cassette receiving and discharging position and a loading position and being operative to receive a selected one of said relatively large-sized and small-sized cassettes when in said cassette receiving and discharging position and to convey the selected cassette therewith to said loading position;

means guiding said cassette holder to move in a path having a rectilinear portion extending from said cassette receiving and discharging position to an intermediate position and a right-angled portion extending from said intermediate position to said losing position;

a pair of reel bases movable relative to each other for varying the center-to-center distance between said reel bases;

reel base adjusting means selectively driven in a first mode for moving said reel bases to first position in which said center-to-center distance therebetween is equal to said first center-to-center distance so as to be engageable with the reels of a relatively large-sized cassette conveyed by said cassette holder to said loading position, and in a second mode for moving said reel bases to second positions in which said center-to-center distance therebetween is equal to said second center-to-center distance so as to be engageable with the reels of a relatively small-sized cassette conveyed by said cassette holder to said loading position, said reel base adjusting means completes movements of said reel bases to said first positions or said second positions thereof during movement of said cassette holder along said rectilinear path portion to said intermediate position;

detecting means including a cassette sensing member for detecting the size of a cassette received in said cassette holder in said cassette receiving and discharging position and which selects first and second conditions when detecting said relatively large-sized and relatively small-sized cassettes, respectively; and drive means movable with said cassette holder only between said cassette receiving and discharging position and said intermediate position and being responsive to said first and second conditions of said detecting means for driving said reel base adjusting means in said first and second modes, respectively, and thereby disposing said reel bases in said first and second positions, respectively, thereof when said cassette holder conveys a relatively large-sized cassette or a relatively small-sized cassette, respectively, to said loading position, said drive means including a drive member mounted on said cassette holder for movement with said cassette holder in the direction of said rectilinear portion of the path and being movable relative to said cassette holder at right angles to said direction of the rectilinear portion between first and second positions of said drive member corresponding to said first and second modes of the reel base adjusting means, said cassette sensing member being connected with said drive member and being selectively engageable by said selected one of the relatively large-sized and small-sized cassettes received in said cassette holder for disposing said drive member in said first or second position thereof.

12. A tape cassette recording and/or reproducing apparatus according to claim 11; in which said reel base adjusting means includes first and second gear racks mounted for rectilinear movements in respective paths extending parallel with said rectilinear portion of the path of movement of the cassette holder and being spaced from each other in the direction of the relative movement of said drive member in respect to said cassette holder so that said first and second gear racks are engageable by said drive member in said fist and second positions, respectively, of the latter for movement by said drive member with said cassette holder in moving along said rectilinear portion of the path of said holder, gear means meshing with said gear racks for constraining said gear racks to move in opposite directions in said respective paths, and means establishing said first mode when said first gear rack is engaged by said drive member and establishing said second mode when said second gear rack is engaged by said drive member.

13. A tape cassette recording and/or reproducing apparatus according to claim 12; in which said gear means include first and second pinions meshing with said first and second gear racks, respectively, and also meshing with each other; and in which said reel base adjusting means further includes a driven gear meshing with one of said first and second pinions to be turned in a first direction to a first position when said first gear rack is engaged and moved by said drive member and to be turned in a second direction to a second position when said second gear rack is engaged and moved by said drive member.

14. A tape cassette recording and/or reproducing apparatus according to claim 13; in which said reel base adjusting means further includes stop means for limiting movements of said reel bases at said first and second positions thereof, and transmission means urging said reel bases to move past said first and second positions thereof upon turning of said driven gear to said first and second positions, respectively, of the driven gear, said transmission means including spring means which is loaded when said stop means limit movements of said reel bases at either of said first and second positions thereof so that a force exerted by the loaded spring means ensures precise positioning of said reel bases at said first and second positions.

15. A tape cassette recording and/or reproducing apparatus according to claim 14; in which said transmission means includes a crank pin extending from said driven gear, a lever having a slot along one end portion slidably receiving said crank pin, means mounting said lever at another end of the latter for angular movements about a pivot axis which is displaceable against said force exerted by said loaded spring means, and a connecting member coupled with said lever for moving said reel bases in response to said angular movements of the lever.

16. A tape cassette recording and/or reproducing apparatus according to claim 15; in which said driven gear is turned more than 180 degrees between said first and second positions thereof, and in which maximum angular movements of said lever and maximum loading of said spring means occur at positions of said driven gear spaced in said second and first directions of turning thereof from said first and second positions, respectively, of the driven gear, whereby inadvertent turning of said driven gear from said first or second position thereof is prevented.

17. A tape cassette recording and/or reproducing apparatus according to claim 15; in which said means mounting the lever at said other end includes a pair of support links in a scissor-like arrangement with a common fixed pivot intermediate their ends, said support links having pivot seats opening toward each other at one end of the links, a pivot pin extending from said other end of the lever and engaging in said pivot seats to define said pivot axis which is displaceable, and a stop member interposed between the other ends of said support links; and in which said spring means is a tension spring extending between said other ends of the support links for urging the latter against opposite sides of said stop member.

18. A tape cassette recording and/or reproducing apparatus capable of selective operation with a relatively large-sized cassette and a relatively small-sized cassette having relatively large and small widths, respectively, and containing respective pairs of rotatable reels which, in said large-sized cassette, have a first relatively large center-to-center distance and, in said small-sized cassette, have a second relatively small center-to-center distance, said apparatus comprising:

a cassette holder movable between a cassette receiving and discharging position and a loading position and being operative to receive a selected one of said relatively large-sized and small-sized cassettes when in said cassette receiving and discharging position and to convey the selected cassette therewith to said loading position;

a pair of reel bases movable relative to each other for varying the center-to-center distance between said reel bases;

reel base adjusting means selectively driven in a first mode for moving said reel bases to first positions in which said center-to-center distance therebetween is equal to said first center-to-center distance so as to be engageable with the reels of a relatively large-sized cassette conveyed by said cassette holder to said loading position, and in a second mode for moving said reel bases to second positions in which said center-to-center distance therebetween is equal to said second center-to-center distance so as to be engageable with the reels of a relatively small-sized cassette conveyed by said cassette holder to said loading position, said reel base adjusting means including a crank wheel turned in a first direction to a first position when said reel base adjusting means is driven in said first mode and turned in a second direction to a second position when said reel base adjusting means is driven in said second mode, stop means for limiting movements of said reel bases at said first and second positions thereof, and transmission means urging said reel bases to move past said first and second positions thereof upon turning of said crank wheel to said first and second positions, respectively, of the crank wheel, said transmission means including spring means which is loaded when said stop means limit movements of said reel bases at either of said first and second positions thereof so that a force exerted by the loaded spring means ensures precise positioning of said reel bases at said first and second positions, a crank pin extending from said crank wheel, a lever having a slot along one end portion slidably receiving said crank pin, means mounting said lever at another end of said lever for angular movements about a pivot axis which is displaceable against said force exerted by said loaded spring means, and means including a connecting member coupled with said leer for moving said reel bases in response to said angular movements of the lever;

detecting means for detecting the size of a cassette received in said cassette holder in said cassette receiving and discharging position and which selects first and second conditions when detecting said relatively large-sized and relatively small-sized cassettes, respectively; and drive means movable with said cassette holder at least part of the way from said cassette receiving and discharging position toward said loading position and being responsive to said first and second conditions of said detecting means for driving said reel base adjusting means in said first and second modes, respectively, and thereby disposing said reel bases in said first and second positions, respectively, thereof when said cassette holders conveys a relatively large-sized cassette or a relatively small-sized cassette, respectively, to said loading position; and means including a motor for moving said cassette holder between said cassette receiving and discharging positions and said loading position so that said motor is also operable, through said cassette holder and said drive means, for driving said reel base adjusting means.

19. A tape cassette recording and/or reproducing apparatus according to claim 18; in which said crank wheel is turned more than 180 degrees between said first and second positions thereof, and in which maximum angular movements of said lever and maximum loading of said spring means occur when said crank wheel is turned in said second and first directions from said first and second positions, respectively, of the crank wheel, whereby inadvertent turning of said crank wheel from said first or second position thereof is prevented.

20. A tape cassette recording and/or reproducing apparatus according to claim 19; in which said means mounting the lever at said other end includes a pair of support links in a scissor-like arrangement with a common fixed pivot intermediate their ends, said support links having pivot seats opening toward each other at one end of the links, a pivot pin extending from said other end of the lever and engaging in said pivot seats to define said pivot axis which is displaceable, and a stop member interposed between the other ends of said support links; and in which said spring means is a tension spring extending between said other ends of the support links for urging the latter against opposite sides of said stop member.

* * * * *